US006970444B2

(12) United States Patent
Chwieseni et al.

(10) Patent No.: US 6,970,444 B2
(45) Date of Patent: Nov. 29, 2005

(54) SYSTEM AND METHOD FOR SELF PROPAGATING INFORMATION IN AD-HOC PEER-TO-PEER NETWORKS

(75) Inventors: Edward T. Chwieseni, Longwood, FL (US); Eric D. White, Altamonte Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 67 days.

(21) Appl. No.: 10/142,789

(22) Filed: May 13, 2002

(65) Prior Publication Data

US 2004/0022221 A1 Feb. 5, 2004

(51) Int. Cl.[7] .............................................. H04Q 7/24
(52) U.S. Cl. ..................................... 370/338; 370/400
(58) Field of Search .............................. 370/236, 254, 370/332, 338, 400; 455/410, 445, 446, 456, 455/500, 509, 510, 517, 518–519, 456.2; 714/748, 749

(56) References Cited

U.S. PATENT DOCUMENTS

| 4,494,192 A | 1/1985 | Lew et al. .................... 364/200 |
| 4,617,656 A | 10/1986 | Kobayashi et al. ............ 370/74 |
| 4,736,371 A | 4/1988 | Tejima et al. .................. 370/95 |
| 4,742,357 A | 5/1988 | Rackley ....................... 342/457 |
| 4,747,130 A | 5/1988 | Ho .............................. 379/269 |
| 4,910,521 A | 3/1990 | Mellon ......................... 342/45 |
| 5,034,961 A | 7/1991 | Adams ......................... 375/130 |
| 5,068,916 A | 11/1991 | Harrison et al. .............. 455/39 |
| 5,231,634 A | 7/1993 | Giles et al. ................. 370/95.1 |
| 5,233,604 A | 8/1993 | Ahmadi et al. ............... 370/60 |
| 5,241,542 A | 8/1993 | Natarajan et al. .......... 370/95.3 |
| 5,317,566 A | 5/1994 | Joshi ............................ 370/60 |
| 5,392,450 A | 2/1995 | Nossen ...................... 455/12.1 |
| 5,412,654 A | 5/1995 | Perkins ....................... 370/94.1 |
| 5,424,747 A | 6/1995 | Chazelas ...................... 342/70 |
| 5,448,760 A * | 9/1995 | Frederick .................... 455/410 |
| 5,502,722 A | 3/1996 | Fulghum .................... 370/69.1 |
| 5,517,491 A | 5/1996 | Nanni et al. ................... 370/29 |
| 5,555,425 A | 9/1996 | Zeller et al. ................ 395/800 |
| 5,555,540 A | 9/1996 | Radke ........................ 370/16.1 |
| 5,572,528 A | 11/1996 | Shuen ...................... 370/85.13 |
| 5,583,866 A | 12/1996 | Vook et al. |
| 5,615,212 A | 3/1997 | Ruszczyk et al. ........... 370/433 |
| 5,618,045 A | 4/1997 | Kagan et al. ................. 463/40 |
| 5,621,732 A | 4/1997 | Osawa ......................... 370/79 |
| 5,623,495 A | 4/1997 | Eng et al. .................... 370/397 |
| 5,627,976 A | 5/1997 | McFarland et al. ......... 395/308 |
| 5,631,897 A | 5/1997 | Pacheco et al. ............. 370/237 |
| 5,644,576 A | 7/1997 | Bauchot et al. ............. 370/437 |
| 5,652,751 A | 7/1997 | Sharony ..................... 370/227 |
| 5,680,392 A | 10/1997 | Semaan ..................... 370/261 |

(Continued)

FOREIGN PATENT DOCUMENTS

EP       0513841 A2    11/1992

(Continued)

Primary Examiner—Man U. Phan
Assistant Examiner—Toan Nguyen
(74) Attorney, Agent, or Firm—Joseph J. Buczynski; Gardner Carton & Douglas LLP (57) ABSTRACT

A system and method for providing network data and system upgrades to individual nodes within an ad-hoc network without requiring network-wide information broadcasts. The system and method identifies adjacent devices authorized to share system and upgrade information. Nodes are directed to prepare and transmit requests for upgrade information from adjacent devices, such that upgrade information may be passed, from one node to the next, reaching each node in the network. The node-to-node upgrade propagation thereby replaces traditional network-wide broadcasts of upgrade information.

21 Claims, 6 Drawing Sheets

U.S. PATENT DOCUMENTS

| | | | | |
|---|---|---|---|---|
| 5,684,794 | A | 11/1997 | Lopez et al. | 370/337 |
| 5,687,194 | A | 11/1997 | Paneth et al. | 375/283 |
| 5,696,903 | A | 12/1997 | Mahany | 395/200.58 |
| 5,701,294 | A | 12/1997 | Ward et al. | 370/252 |
| 5,706,428 | A | 1/1998 | Boer et al. | 395/200 |
| 5,717,689 | A | 2/1998 | Ayanoglu | 370/349 |
| 5,745,483 | A | 4/1998 | Nakagawa et al. | 370/335 |
| 5,774,876 | A | 6/1998 | Wooley et al. | 705/28 |
| 5,781,540 | A | 7/1998 | Malcolm et al. | 370/321 |
| 5,787,080 | A | 7/1998 | Hulyalkar et al. | 370/348 |
| 5,794,154 | A | 8/1998 | Bar-On et al. | 455/509 |
| 5,796,727 | A * | 8/1998 | Harrison et al. | 370/338 |
| 5,796,732 | A | 8/1998 | Mazzola et al. | 370/362 |
| 5,796,741 | A | 8/1998 | Saito et al. | 370/439 |
| 5,805,593 | A | 9/1998 | Busche | 370/396 |
| 5,805,842 | A | 9/1998 | Nagaraj et al. | 395/306 |
| 5,805,977 | A | 9/1998 | Hill et al. | 455/31.3 |
| 5,809,518 | A | 9/1998 | Lee | 711/115 |
| 5,822,309 | A | 10/1998 | Ayanoglu et al. | 370/315 |
| 5,844,905 | A | 12/1998 | McKay et al. | 370/443 |
| 5,845,097 | A | 12/1998 | Kang et al. | 395/297 |
| 5,857,084 | A | 1/1999 | Klein | 395/309 |
| 5,870,350 | A | 2/1999 | Bertin et al. | 365/233 |
| 5,877,724 | A | 3/1999 | Davis | 342/357 |
| 5,881,095 | A | 3/1999 | Cadd | 375/202 |
| 5,881,372 | A | 3/1999 | Kruys | 455/113 |
| 5,886,992 | A | 3/1999 | Raatikainen et al. | 370/410 |
| 5,896,561 | A | 4/1999 | Schrader et al. | 455/67.1 |
| 5,903,559 | A | 5/1999 | Acharya et al. | 370/355 |
| 5,909,651 | A | 6/1999 | Chander et al. | 455/466 |
| 5,936,953 | A | 8/1999 | Simmons | 370/364 |
| 5,943,322 | A | 8/1999 | Mayor et al. | 370/280 |
| 5,987,011 | A | 11/1999 | Toh | 370/331 |
| 5,987,018 | A | 11/1999 | Freeburg et al. | |
| 5,987,033 | A | 11/1999 | Boer et al. | 370/445 |
| 5,991,279 | A | 11/1999 | Haugli et al. | 370/311 |
| 6,026,303 | A | 2/2000 | Minamisawa | |
| 6,028,853 | A | 2/2000 | Haartsen | 370/338 |
| 6,029,217 | A | 2/2000 | Arimilli et al. | 710/107 |
| 6,034,542 | A | 3/2000 | Ridgeway | 326/39 |
| 6,044,062 | A | 3/2000 | Brownrigg et al. | 370/238 |
| 6,047,330 | A | 4/2000 | Stracke, Jr. | 709/238 |
| 6,052,594 | A | 4/2000 | Chuang et al. | 455/450 |
| 6,052,752 | A | 4/2000 | Kwon | 710/126 |
| 6,064,626 | A | 5/2000 | Stevens | 365/233 |
| 6,067,291 | A | 5/2000 | Kamerman et al. | 370/338 |
| 6,078,566 | A | 6/2000 | Kikinis | 370/286 |
| 6,104,712 | A | 8/2000 | Robert et al. | 370/389 |
| 6,108,738 | A | 8/2000 | Chambers et al. | 710/113 |
| 6,115,580 | A | 9/2000 | Chuprun et al. | 455/1 |
| 6,122,690 | A | 9/2000 | Nannetti et al. | 710/102 |
| 6,130,881 | A | 10/2000 | Stiller et al. | 370/238 |
| 6,132,306 | A | 10/2000 | Trompower | 453/11.1 |
| 6,147,975 | A | 11/2000 | Bowman-Amuah | 370/252 |
| 6,163,699 | A | 12/2000 | Naor et al. | 455/453 |
| 6,178,337 | B1 | 1/2001 | Spartz et al. | 455/561 |
| 6,192,053 | B1 | 2/2001 | Angelico et al. | 370/448 |
| 6,192,230 | B1 | 2/2001 | Van Bokhorst et al. | 455/343 |
| 6,208,870 | B1 | 3/2001 | Lorello et al. | 455/466 |
| 6,223,240 | B1 | 4/2001 | Odenwald et al. | 710/129 |
| 6,240,294 | B1 | 5/2001 | Hamilton et al. | 455/456 |
| 6,246,875 | B1 | 6/2001 | Seazholtz et al. | 455/432 |
| 6,249,516 | B1 | 6/2001 | Brownrigg et al. | 370/338 |
| 6,275,707 | B1 | 8/2001 | Reed et al. | 455/456 |
| 6,285,892 | B1 | 9/2001 | Hulyalkar | 455/574 |
| 6,304,556 | B1 | 10/2001 | Haas | 370/254 |
| 6,327,300 | B1 | 12/2001 | Souissi et al. | 375/219 |
| 6,349,091 | B1 | 2/2002 | Li | 370/238 |
| 6,349,210 | B1 | 2/2002 | Li | 455/450 |
| 6,434,158 | B1 * | 8/2002 | Harris et al. | 370/401 |
| 6,456,599 | B1 * | 9/2002 | Elliott | 370/254 |
| 6,519,464 | B1 * | 2/2003 | Santhoff et al. | 455/456.5 |
| 6,625,135 | B1 * | 9/2003 | Johnson et al. | 370/332 |
| 6,711,409 | B1 * | 3/2004 | Zavgren et al. | 455/445 |
| 2001/0053699 | A1 | 12/2001 | McCrady et al. | 455/513 |

FOREIGN PATENT DOCUMENTS

| | | |
|---|---|---|
| EP | 0627827 A2 | 12/1994 |
| EP | 0924890 A2 | 6/1999 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

* cited by examiner

SYSTEM AND METHOD FOR SELF PROPAGATING INFORMATION IN AD-HOC PEER-TO-PEER NETWORKS

BACKGROUND OF THE INVENTION

1. Field of the Invention

The present invention relates to a system and method for providing network data and system upgrades to individual devices within an ad-hoc network without requiring network-wide information broadcasts. More particularly, the present invention relates to a system and method for creating and broadcasting requests for data and upgrades between adjacent devices, wherein an individual device can update system parameters from information provided by adjacent devices, where such transfers are authorized.

2. Description of the Related Art

In recent years, a type of mobile communications network known as an "ad-hoc" network has been developed. In this type of network, each user terminal (hereinafter "mobile node") is capable of operating as a base station or router for other mobile nodes, thus eliminating the need for a fixed infrastructure of base stations. Accordingly, data packets being sent from a source mobile node to a destination mobile node are typically routed through a number of intermediate mobile nodes before reaching the destination node.

More sophisticated ad-hoc networks are also being developed which, in addition to enabling mobile nodes to communicate with each other, as in a conventional ad-hoc network, further enable the mobile nodes to access a fixed network and communicate with other types of user terminals, such as those on the public switched telephone network (PSTN) and on other networks, such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

Generally, all nodes in a wireless ad-hoc peer-to-peer network provide similar services and functionality. Although each node can provide similar services, the workload is typically distributed across many nodes rather than centralized at a single location in the peer-to-peer network. Therefore peer-to-peer networks distinguish themselves from infrastructure networks where one or more nodes offer a superset of the functionality of the rest of the network. Infrastructure nodes in these networks typically can handle Dynamic Host Configuration Protocol (DHCP), Address Resolution Protocol (ARP), as well as other services that depend on broadcast traffic. Dynamic Host Configuration Protocol is defined by IETF RFC 2131 and 2132, and is used by a client node to automatically obtain network settings from a central server. These network settings include the client's IP address, the address of Domain Name Servers (DNS), the IP address of default gateways, and many other network settings. Address resolution protocol is defined by STD 0037 and RFC 0826, and is used by a network node to map IP addresses to MAC addresses so IP traffic can be delivered to specific hardware. These infrastructure nodes are normally discovered by broadcast traffic advertisements from their client nodes in a network.

Peer-to-peer networks typically do not contain specialized infrastructure nodes. The IEEE 802.11 standard offers a peer-to-peer mode in addition to an infrastructure mode. Details of the 802.11 standards are set forth in ISO/IEC 8802-11, ANSI/IEEE 802.11 "Information Technology—Telecommunications and Information Exchange Between Systems—Local and Metropolitan Area Network Specific Requirements", Part 11: Wireless Medium Access Control (MAC) and Physical Layer (PHY) Specifications, the entire contents of which being incorporated herein by reference. Also, a description of the 802.11 standard is found in a book by Bob O'Hara and Al Petrick entitled *IEEE 802.11 Handbook: A Designer's Companion*, IEEE, 1999, the contents comprising this description being incorporated herein by reference.

Although broadcast communication may be used to identify and configure nodes within the ad-hoc network, wireless ad-hoc routing networks typically avoid repeating broadcast traffic in an effort to avoid "broadcast storms" which can flood the transmission medium with traffic and cripple the ability of the network to perform. Broadcast traffic reception is usually limited to nodes in the immediate listening area of the transmitting node. Since ARP and DHCP depend on broadcast traffic, ad-hoc routing networks sometimes "tunnel" this broadcast traffic in directed packets to known infrastructure nodes where it can be handled. Traditional non-ad-hoc networks do not encounter the broadcast problem because their nodes communicate directly with each other.

However, wireless peer-to-peer ad-hoc routing networks do not contain infrastructure nodes and therefore do not have the option to tunnel their broadcast traffic. Hence, DHCP, ARP and other broadcast network protocols must be handled in another way. In a traditional wired network, system information is usually broadcast to all devices, while upgrades are sent individually from a central location. In an ad-hoc network, however, it is undesirable to broadcast to all devices of the network since the network could become flooded. Accordingly, a need exists for a system and method where adjacent devices within the ad-hoc network, as well as the infrastructure, may be used to distribute system information directly to adjacent devices upon request without the need for network-wide broadcasts.

SUMMARY OF THE INVENTION

An object of the present invention is to provide a system and method for self-propagating information in an ad-hoc peer-to-peer network.

Another object of the present invention is to provide a system and method for locating adjacent nodes, or "neighbor" nodes, of a node requesting network data and system upgrades in an ad-hoc network.

Still another object of the present invention is to provide a system and method for preparing and transmitting a request for specific information between a requesting node and neighbor nodes.

Still another object of the present invention is to provide a system and method for preparing and transmitting specific information data packets between neighbor nodes and requesting nodes, such that requesting nodes may update network and system information.

These and other objects are substantially achieved by providing a system and method for identifying adjacent devices within the network which may provide data upgrades. The system and method creates and broadcasts requests for data upgrades between adjacent devices which respond with the requested information. An individual device can update system parameters from information provided by adjacent devices where such transfers are authorized, without network-wide broadcasts.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
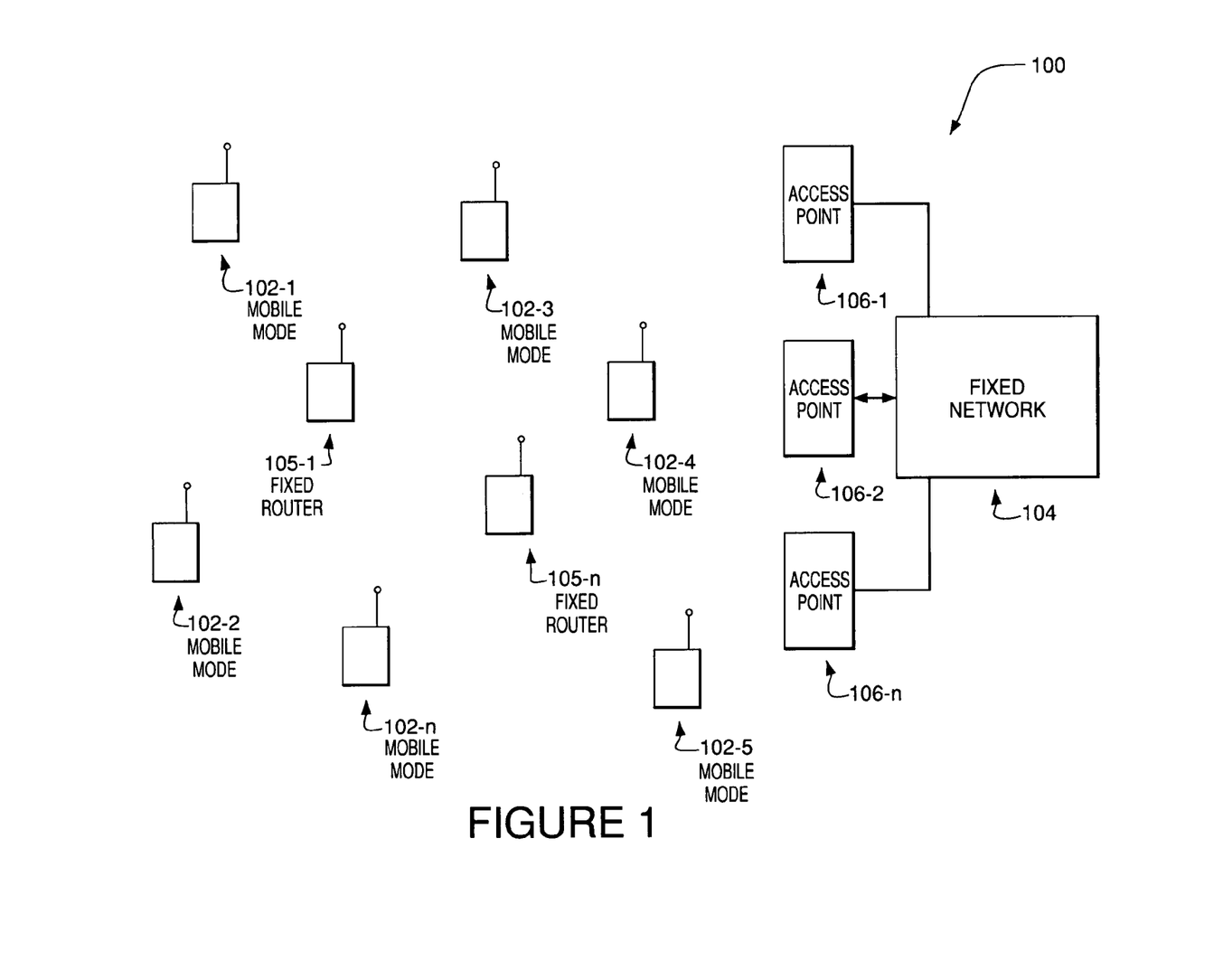
FIG. 1 is a block diagram of an example of an ad-hoc wireless communications network including a plurality of nodes employing an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers, to provide network nodes with access to other networks, such as other ad-hoc networks, the public switched telephone network (PSTN) and the Internet. The network 100 further can include a plurality of fixed routers 105-1 through 105-n (referred to generally as nodes 105 or fixed routers 105) for routing data packets between other nodes 102, 106 or 105. It is noted that for purposes of this discussion, the nodes discussed above can be collectively referred to as "nodes 102, 105 and 106", or simply "nodes".

As can be appreciated by one skilled in the art, the nodes 102, 105 and 106 are capable of communicating with each other directly, or via one or more other nodes operating as a router or routers for packets being sent between nodes, as described in U.S. Pat. No. 5,943,322 to Mayor, which is incorporated herein by reference, and in U.S. patent application Ser. Nos. 09/897,790, 09/815,157 and 09/815,164, referenced above.

Figure 2:
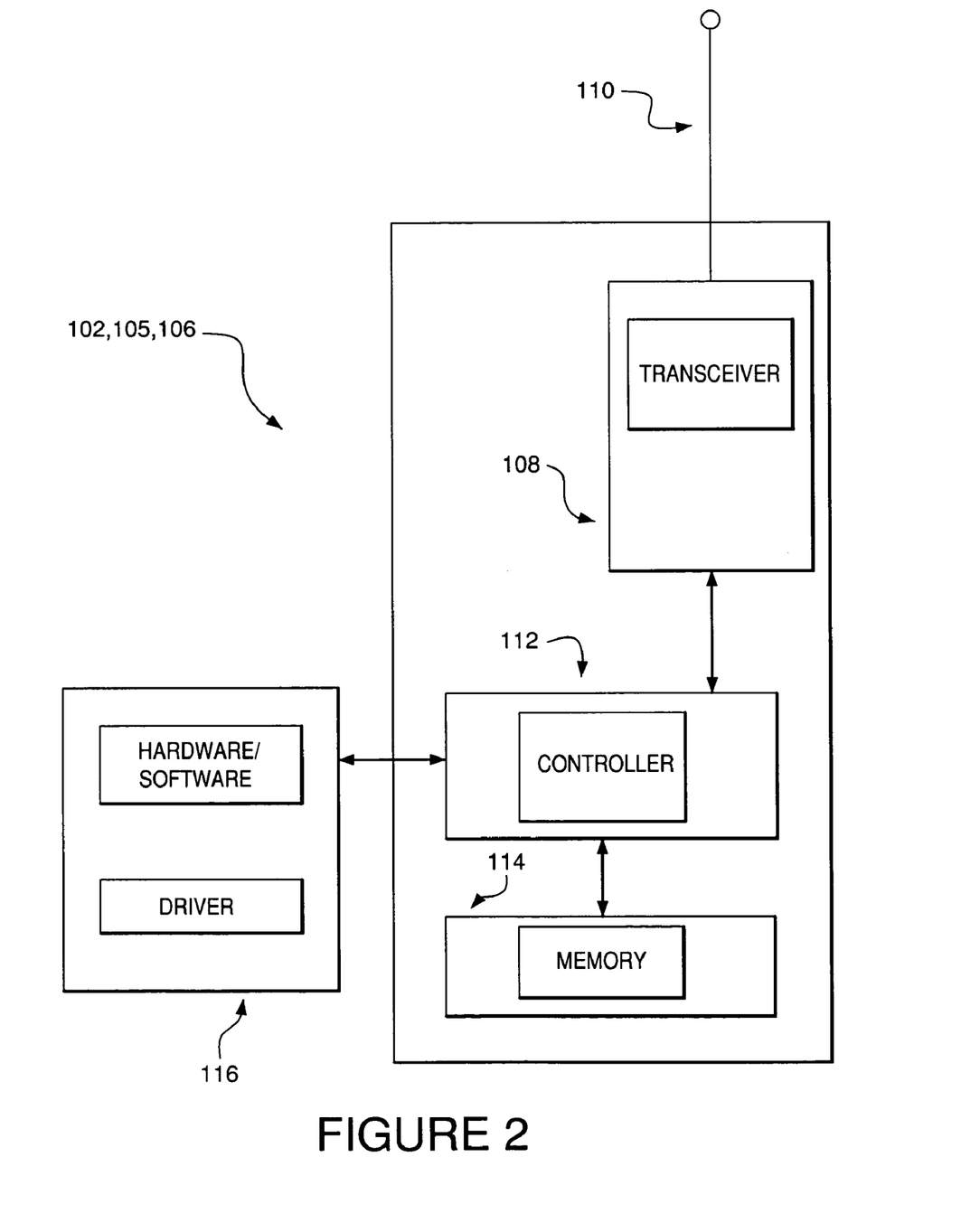
FIG. 2 is a block diagram of an example of a wireless node as shown in FIG. 1.

As shown in FIG. 2, each node 102, 105 and 106 includes a transceiver 108, including a transmitter and a receiver, which collectively can be referred to as a modem. The transceiver is coupled to an antenna 110 and is capable of receiving and transmitting signals, such as packetized signals, to and from the node 102, 106 or 105, under the control of a controller 112. The packetized data signals can include, for example, voice, data or multimedia information, and packetized control signals, including node update information.

Each node 102, 105 and 106 further includes a memory 114, including a read only memory (ROM) for storing information pertaining to the operation of the node, and a random access memory (RAM) for storing information such as routing information pertaining to itself and other nodes in the network 100. The nodes 102, 105 and 106 exchange their respective routing information, referred to as routing advertisements or routing table information, with each other via a broadcasting mechanism periodically, for example, when a new node enters the network 100, or when existing nodes in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 105 and 106 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Each node of the network in FIG. 1 is required to maintain current network information for proper operation. For instance, the Admission Control (AC) module of transceiver 108 acts on packets flowing between the IP stack module of the host 116 and the IP stack module and the traffic control (TC) module of transceiver 108. In doing so, the AC module relies on local broadcasts, ad hoc routing updates, and unicast requests for information to provide services to the IP stacks. Further details of the operations and protocols are set forth in a U.S. Provisional Patent Application of Eric A. Whitehill entitled "Embedded Routing Algorithms Under the Internet Protocol Routing Layer in a Software Architecture Protocol Stack", Ser. No. 60/297,769, filed on Jun. 14, 2001, the entire content of which is incorporated herein by reference.

As discussed in the Background section, if a mobile node 102 in network 100 of FIG. 1 were to broadcast a request for information, such as an ARP request to all the wireless nodes on the network, including all mobile nodes 102 and IAPs 106, such a broadcast could overload the radio network. Therefore, in an embodiment of the present invention shown in FIG. 2, when a host 116 sends a request for information, the subscriber device transceiver 108 intercepts the request and determines a neighbor node, or nodes, which may provide the information. Once a neighbor node or nodes are determined, the transceiver forwards the request for information directly to the neighbor node for resolution, instead of performing a traditional broadcast of the request. Specifically, the requesting node 102 unicasts the request for information to the neighbor nodes which are capable of responding.

The neighbor node or nodes, resolve the query by looking first in the neighbor node's own cache tables, or, if necessary, by querying other adjacent nodes. The neighbor node then returns a message to the requesting node 102 containing the requested information. Specifically, the neighbor node unicasts a reply to the requesting node 102. In addition to reducing network wide broadcasts, an additional benefit results in that the transfer of a unicast message from the neighbor node to the requesting node is much more reliable than the transfer of a broadcast message.

In yet another embodiment of the present invention, the requesting node may request a listing of data neighbor nodes are authorized to provide. The neighbor nodes, may in turn, provide a list of current data to the requesting node, thereby allowing the requesting node to determine from the data received if data revisions are required, and thereafter requesting the specific data revisions required.

Figure 3A:
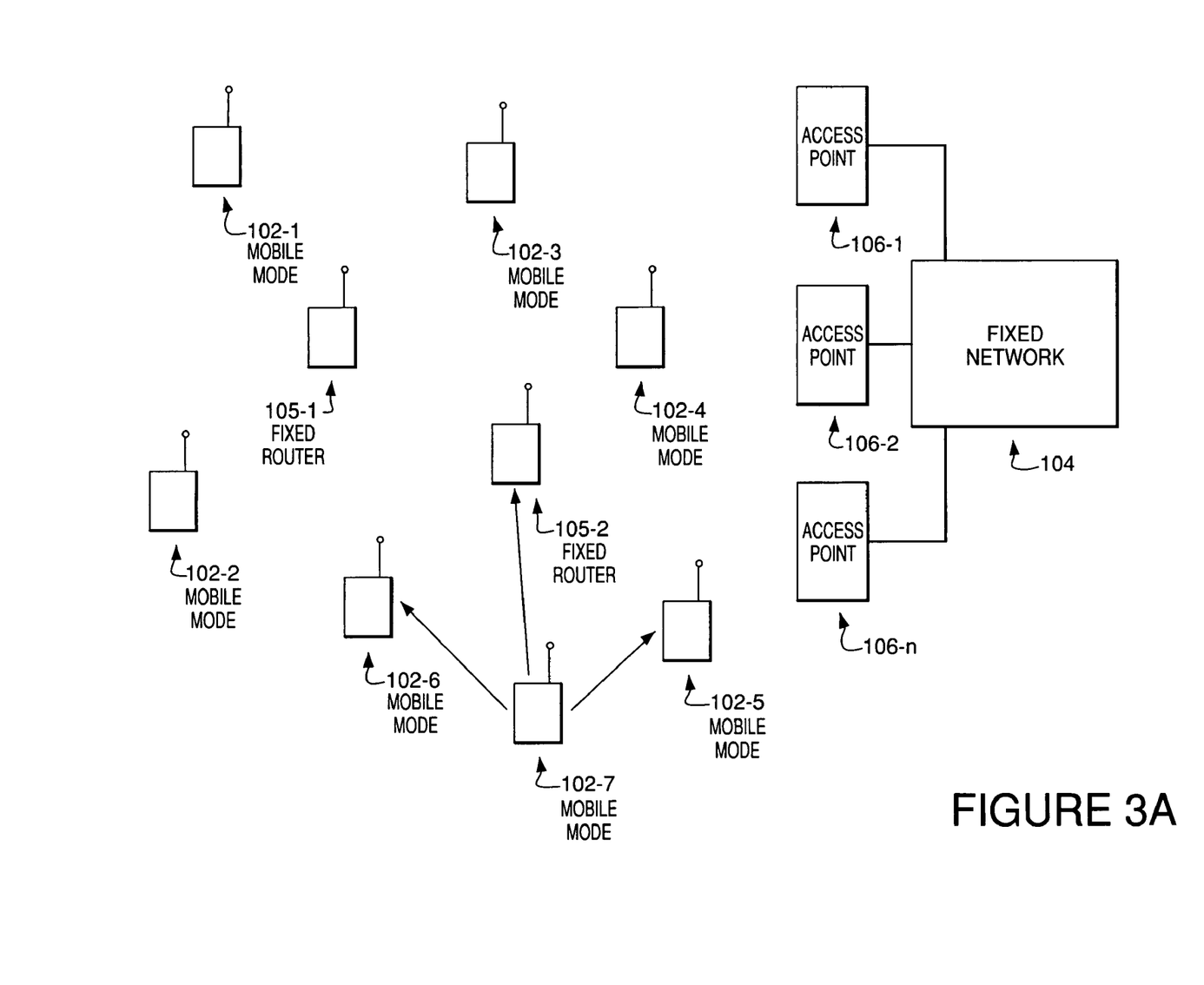
FIG. 3A is a block diagram of an example of a broadcast request for information by a node in FIG. 1.

In an embodiment of the present invention shown in FIG. 3A, when a mobile node 102-7 joins an ad-hoc network it can query its neighbors 102-5, 102-6 and 105-2, to determine the network's current state. This can be as simple as obtaining network time values, for operations requiring synchronization, or obtaining network configurations, such as channel usage, carrier location in an area and so forth. In addition, it is possible for nodes to negotiate the correct software and upgrade one another if needed.

In FIG. 3A, when mobile node 102-7 is initialized, it performs a neighborhood discovery process, which determines the proximity of nodes 102-5, 102-6 and 105-2. Once the node has an established list of neighbor devices, it can query them for their system parameters. When the neighbor nodes 102-5, 102-6 and 105-2, receive such a request, they create response packets and send them to the requesting node 102-7. The response packets will contain the information each neighbor node is authorized to share regarding the system data.

Once all response packets are gathered together, node 102-7 can determine whether it needs to update any of its parameters and which neighbor node is authorized to provide the required data updates. If none of the neighbors are able and/or willing to provide the updates, then node 102-7 can query the infrastructure, such as nodes 106, for the required information. The infrastructure in the network 100, such as the IAPs 106s points, will typically maintain the system information and any network upgrades.

Once a candidate is identified, node 102-7 can contact the neighbor node and request specific information from that neighbor. If new software is available then a session can be established to transfer the software to the requesting node as well. Once the software has been downloaded, then the controller 112 of node 102-7 can perform the upgrade.

Figure 3B:
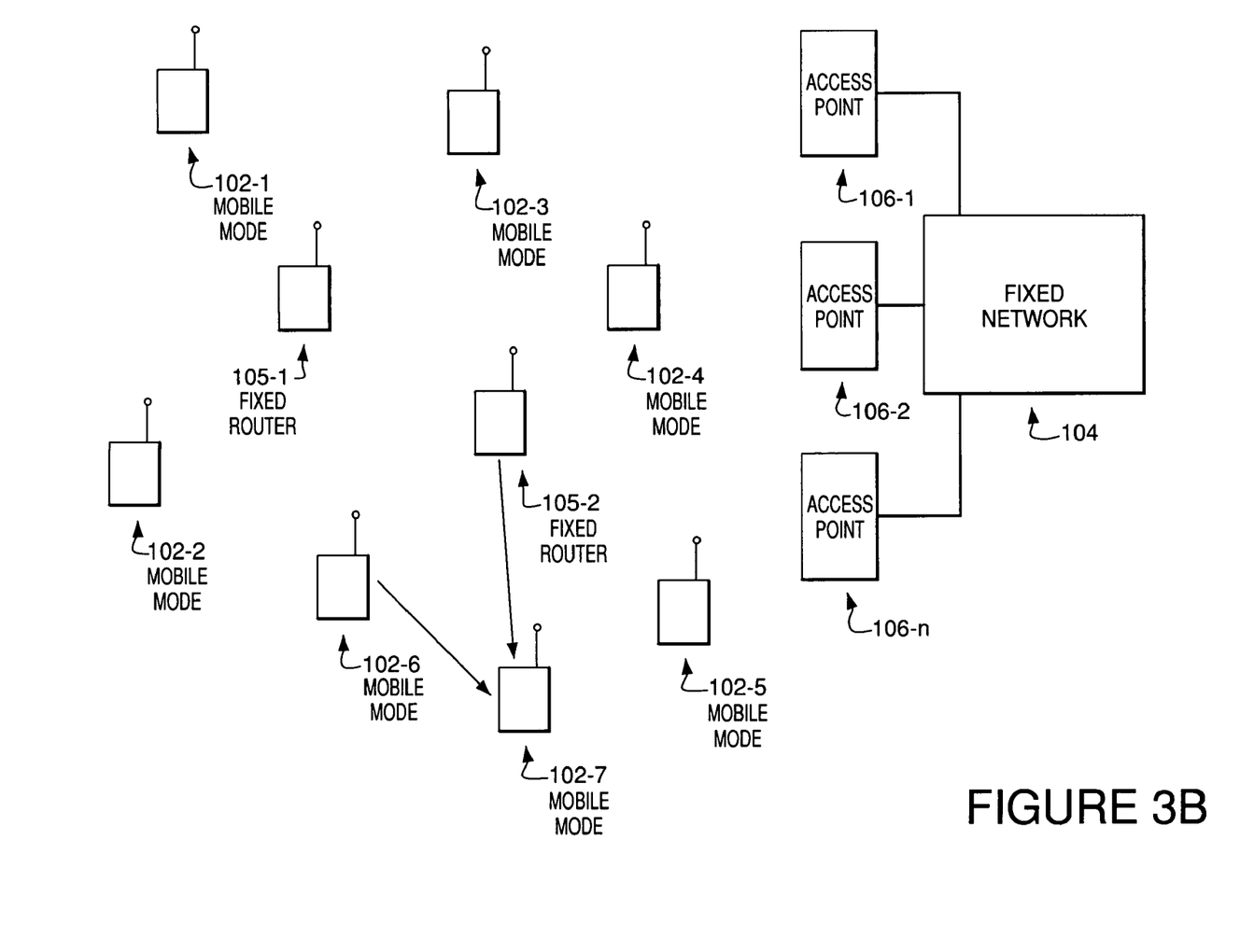
FIG. 3B is a block diagram of an example of responses to the broadcast request in FIG. 3A.

As shown in FIG. 3A, node 102-7 can request information from its neighbors, nodes 102-5, 102-6 and 105-2, at any point in time. The request can be triggered on initialization, by time, or by a specific event. Once the trigger is active, node 102-7 sends a special broadcast to its neighbors, nodes 102-5, 102-6 and 105-2, asking for specific information, such as current software versions or system parameters. If nodes 102-5, 102-6 and 105-2 are authorized to respond to the request, each will create a response packet containing the parameters, or list of parameters authorized to provide, and transmit the packet to the requesting node 102-7, as shown in FIG. 3B. In FIG. 3B, neighbor nodes 102-6 and 105-2 have prepared and sent response packets to the requesting node 102-7. For illustration purposes, node 102-5 lacks authorization to provide the requested information, therefore no response packet is prepared or sent to the requesting node.

As shown in FIG. 3B, requesting node 102-7 receives and reads each response packet to discover what upgrades are required, and which neighbor node is authorized to transfer such upgrades. The requesting node 102-7 then requests those items of information it is seeking in FIG. 3C.

Figure 3C:
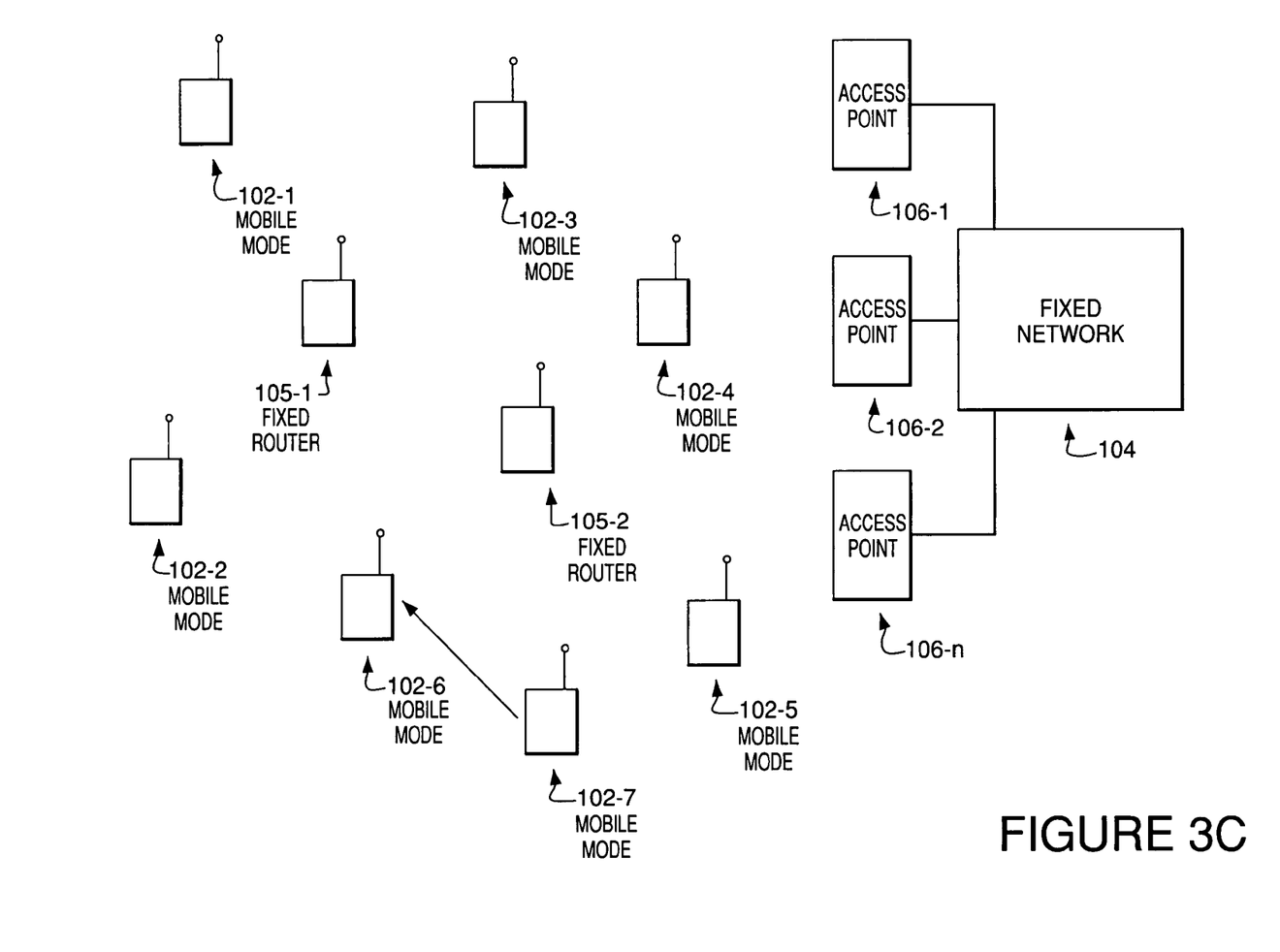
FIG. 3C is a block diagram of an example of a request for specific information by a node in FIG. 1.
Figure 3D:
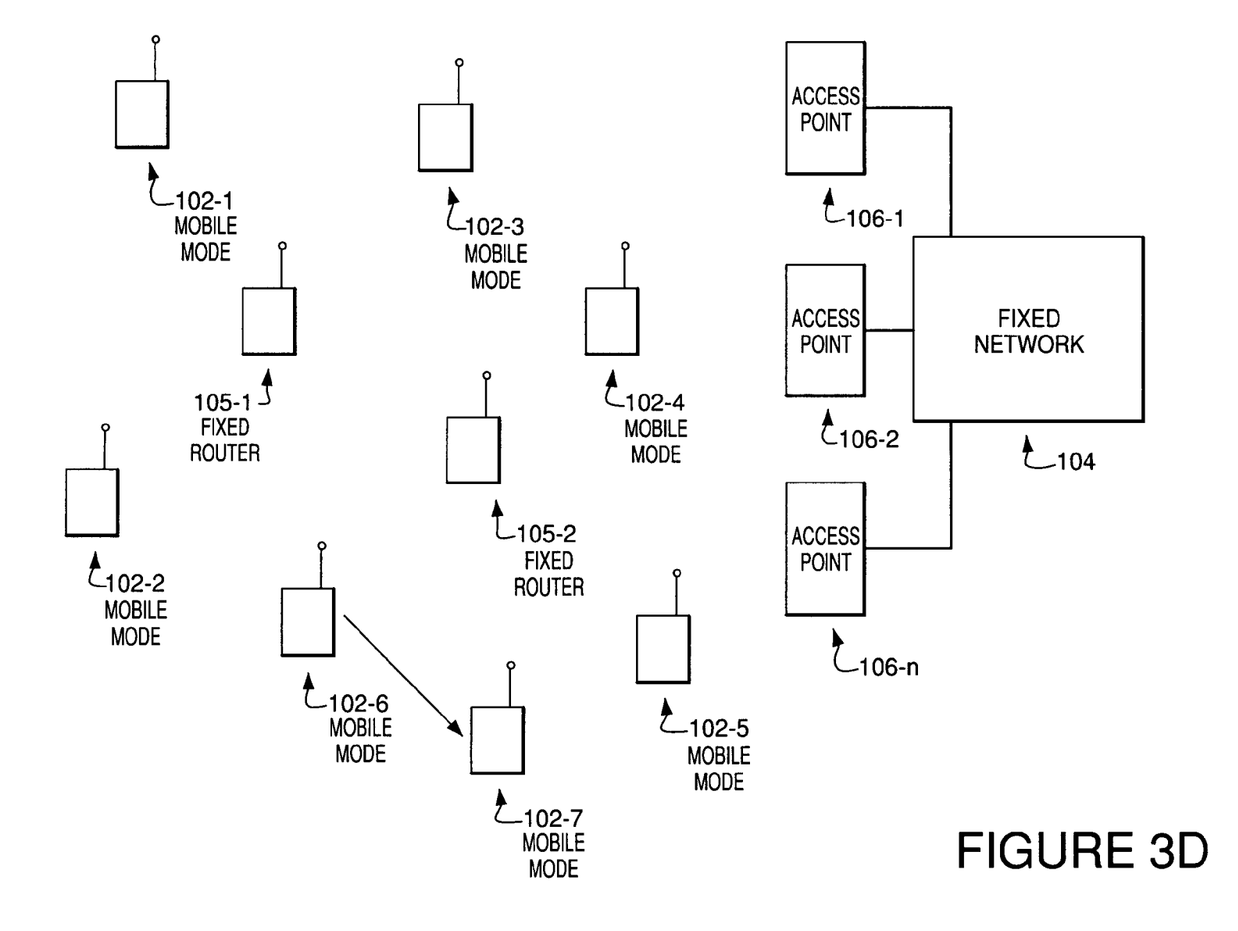
FIG. 3D is a block diagram of an example of a specific response to the broadcast request in FIG. 3C.

In FIG. 3C, node 102-7 prepares and sends a request for specific information packets to node 102-6. For illustration purposes, node 102-7 determined no information was required from node 105-2, therefore no further requests are made to node 105-2. Node 102-6 reads the request packet from node 102-7, then initiates transfer of the data to the requesting node in FIG. 3D. The transferred data may be a single packet or multiple packets as required and each packet may be acknowledged separately or in blocks. Once all the data is received, the requesting node 102-7 acts on the information. This may be as simple as updating its clock or as complex as overwriting the current software load and performing a restart.

Also, nodes within the network can be configured to require the requesting node to authenticate themselves or prove authorization for the service being requested. In such an embodiment, proper authentication must be given to the nodes requesting updates. Such node authentication may be provided along with access authorization for nodes entering the network, or may be provided elsewhere.

Furthermore, the network infrastructure may introduce an upgrade program for all mobile nodes that travels from node to node, validating system information. The network will execute this special program to determine if the information in any node is invalid, at which point the software will request updates from the infrastructure. The propagated upgrade program may be initially broadcast to only those nodes in the proximity of the infrastructure originating the upgrade and thereafter, each node will distribute the upgrades as described above. The system or individual nodes of the network may be enabled or disabled for auto-upgrading and propagation of information from one node to another.

In addition, the present invention may also be utilized for sending information services. For instance, if two neighbor nodes represent devices having subscribed to the same news service, then each may update the other with the latest news, weather, and stock information. Paid advertising can be distributed in a similar fashion. In a first mode, such as peer-to-peer networking without any infrastructure, as a new unit enters the network it can compare its status with its neighbors, including system software. If a new version of software is available then it can be shared by all the systems in the group using the process as well.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for controlling a node in a wireless ad-hoc communication network to acquire information from at least one of a plurality of other nodes in said network, comprising:

controlling said node to send a first request for information to a first group of said plurality of nodes;

controlling said first group of nodes to receive said first request and in response, to determine if any node of said first group is authorized to provide said information, and controlling each said authorized node of said first group to send initial reply data to said node; and controlling said node to, in response to said initial reply data, determine whether a second request is required, and, if so, send said second request to at least one authorized node for specific reply data, said second request comprising a request for specific information available from said authorized node; and controlling said authorized node to send said specific reply data to said node.

2. A method as claimed in claim 1, wherein said first request comprises a request for information available from said authorized nodes of said first group, said information comprises data indicating at least one of the software version, system parameters and information contained at said authorized node.

3. A method as claimed in claim 1, wherein said initial reply data comprises a response from an authorized node indicating said information available to be sent from said authorized node.

4. A method as claimed in claim 1, wherein said specific reply data comprises a response from an authorized node containing said specific information requested by said node.

5. A method as claimed in claim 1, further comprising:
controlling said node to operate in accordance with said specific reply data received from an authorized node.

6. A method as claimed in claim 1, wherein said first and second requests are each sent as a unicast message.

7. A method as claimed in claim 1, wherein said initial reply data and specific reply data each include at least one data packet.

8. A method as claimed in claim 1, further comprising:
authenticating said node before said initial reply data is sent by said authorized node.

9. A method as claimed in claim 1, wherein said method further comprises controlling said node to, in response to said initial reply data, send said second request to at least one infrastructure element of said network for specific data and controlling said infrastructure element to send said specific reply data to said node.

10. A node in an ad-hoc communication network, adapted to acquire information from at least one of a plurality of other nodes in said network, comprising:
a transceiver, adapted to send a first request for information to a first group of said plurality of nodes and to receive initial reply data from nodes of said plurality authorized to provide said information;
a controller adapted to analyze said initial reply data to determine whether a second request is required, with said second request comprising a request for specific information available from said authorized node; and
said transceiver further adapted to send said second request to at least one authorized node for specific reply data and to receive specific reply data from said authorized node.

11. A node as claimed in claim 10, wherein said first request comprises a request for information available from said authorized nodes of said first group, said information comprises data indicating at least one of the software version, system parameters and information contained at said authorized node.

12. A node as claimed in claim 10, wherein said initial reply data comprises a response from an authorized node indicating said information available to be sent from said authorized node.

13. A node as claimed in claim 10, wherein said specific reply data comprises a response from an authorized node containing said specific information requested by said node.

14. A node as claimed in claim 10, wherein:
said controller is further adapted to control said node operation in accordance with said specific reply data received from an authorized node.

15. A node as claimed in claim 10, wherein said first and second requests are each sent as a unicast message.

16. A node as claimed in claim 10, wherein said initial reply data and specific reply data each include at least one data packet.

17. A node as claimed in claim 10, wherein:
said controller is further adapted to provide requesting node authentication to each authorized node before said initial reply data is sent.

18. A node as claimed in claim 10, wherein:
said controller is further adapted to analyze said initial reply data to determine whether said second request should be sent to at least one infrastructure element of said network; and
said transceiver is further adapted to send said second request to at least one infrastructure element and to receive specific reply data from said infrastructure element.

19. A node as claimed in claim 10, wherein:
said controller is further adapted to determine if said node can operate as an authorized node for other nodes of said plurality.

20. A method as claimed in claim 10, wherein:
said transceiver does not receive said initial reply data from any unauthorized node in said first group, and is further adapted to refrain from sending said second request to any said unauthorized node in said first group.

21. A method for controlling a node in a wireless ad-hoc communication network to acquire information from at least one of a plurality of other nodes in said network, comprising:
controlling said node to send a first request for information to a first group of said plurality of nodes;
controlling said first group of nodes to receive said first request and in response, to determine if any node of said first group is authorized to provide said information, and controlling each said authorized node of said first group to send initial reply data to said node, while controlling each unauthorized node in said first group to refrain from sending said initial reply data to said node; and
controlling said node to, in response to said initial reply data, send a second request to at least one authorized node for specific reply data and controlling said authorized node to send said specific reply data to said node, while controlling said node to refrain from sending said second request to any said unauthorized node.

\* \* \* \* \*